United States Patent [19]

Quick

[11] Patent Number: 5,723,223
[45] Date of Patent: Mar. 3, 1998

[54] ULTRASONICALLY BONDED MICROWAVE SUSCEPTOR MATERIAL AND METHOD FOR ITS MANUFACTURE

[75] Inventor: James R. Quick, Greenwood Lake, N.Y.

[73] Assignee: International Paper Company, Purchase, N.Y.

[21] Appl. No.: 772,517

[22] Filed: Oct. 7, 1991

[51] Int. Cl.$^6$ .................. B32B 3/10; B32B 31/16
[52] U.S. Cl. .............. 428/198; 156/73.1; 156/308.4; 428/211; 428/481; 428/511; 428/537.5
[58] Field of Search .................. 428/198, 211, 428/421, 511, 537.5; 219/10.55 E; 426/107, 113, 243, 241; 156/73.1, 308.4

[56] References Cited

U.S. PATENT DOCUMENTS

| | | | |
|---|---|---|---|
| 2,808,192 | 10/1957 | Raisin | 229/31 |
| 3,022,814 | 2/1962 | Bodine, Jr. | 156/73 |
| 3,146,141 | 8/1964 | Woodland | 156/73 |
| 3,541,671 | 11/1970 | Frachot | 29/471.9 |
| 3,765,973 | 10/1973 | Kramer | 156/73 |
| 3,787,257 | 1/1974 | Akerlund | 156/73 |
| 4,147,836 | 4/1979 | Middleton et al. | 428/481 |
| 4,149,288 | 4/1979 | Sendor et al. | 11/1 AD |
| 4,244,762 | 1/1981 | Holson | 156/73.1 |
| 4,268,738 | 5/1981 | Flautt, Jr. et al. | 219/10.55 F |
| 4,327,136 | 4/1982 | Thompson et al. | 428/35 |
| 4,404,052 | 9/1983 | Persson et al. | 156/73.1 |
| 4,713,132 | 12/1987 | Abel et al. | 156/73.1 |
| 4,758,293 | 7/1988 | Samida | 156/73.1 |
| 4,776,901 | 10/1988 | Charlton et al. | 156/73.1 |
| 4,980,223 | 12/1990 | Nakano et al. | 428/198 |
| 5,039,833 | 8/1991 | Woods | 219/10.55 E |
| 5,124,519 | 6/1992 | Roy et al. | 219/10.55 E |
| 5,164,562 | 11/1992 | Huffman et al. | 219/10.55 E |

FOREIGN PATENT DOCUMENTS

| | | |
|---|---|---|
| 2605264 | 4/1988 | France . |
| 1128399 | 9/1968 | United Kingdom . |

*Primary Examiner*—Jenna Davis
*Attorney, Agent, or Firm*—Ostrager, Chong & Flaherty

[57] ABSTRACT

An ultrasonically bonded microwave susceptor material and method for manufacturing this microwave susceptor material. A laminated microwave susceptor material has first and second plies of material ultrasonically bonded together over a part of an area thereof. The first ply of material is a layer of thermally fusible plastic such as a thermoplastic polyester, the second ply of material is a layer of paper or paperboard and at least one of the first and second plies of material includes a microwave interactive material capable of converting microwave energy to thermal energy. The microwave interactive material may consist of a metallized surface on the plastic layer or the paper, and in such cases the metal layer may be arranged between the plastic layer and the paper. The first and second plies of material are ultrasonically bonded along a multiplicity of bonding lines or rows of bonding spots. In this process, the heat fusible plastic is melted and resolidified to secure the first ply to the second ply. In some cases, bonding of the plies is obtained by a localized piercing or degrading of the metal coating that enables formation of a plastic-paper interface.

36 Claims, 3 Drawing Sheets

ULTRASONICALLY BONDED MICROWAVE SUSCEPTOR MATERIAL AND METHOD FOR ITS MANUFACTURE

FIELD OF THE INVENTION

This invention generally relates to microwave susceptor materials used to contain food products during microwave cooking. In particular, the invention relates to microwave susceptor materials having a microwave interactive material which converts microwave radiation into thermal energy.

BACKGROUND ART

In the prior art, microwave susceptor materials for food packaging applications have generally been produced by joining a lightly metallized polyester film to a paper or paperboard substrate using an adhesive to bond the two plies of material together. Although this approach provides a functional microwave susceptor material, it suffers from a number of disadvantages.

In the first place the adhesive used to join the two plies of material must meet various regulatory standards for suitability in food packaging applications. Since microwave susceptor packages reach unusually high temperatures under end-use conditions, the regulatory requirements are correspondingly more demanding than those for conventional food packaging applications. These more rigorous requirements make the selection of suitable adhesives a difficult task and necessitate sophisticated chemical analyses to determine that no harmful components that might migrate into the food are present in the adhesive.

In addition, the process of bonding the metallized polyester film to the paper or paperboard substrate usually requires the use of a laminating machine adapted for that purpose. The laminating process contributes substantially to the overall manufacturing cost, including in some cases, the cost of shipping materials to and from the location of the laminating machine.

Furthermore, adhesive bonding of the plies of material making up the microwave susceptor material becomes increasingly difficult and expensive as the number of plies to be laminated is increased. Even three-ply constructions—for example, a metallized polyester film arranged between two plies of paperboard —are difficult to produce in a manner that provides inter-ply bonds which resist delamination under end-use conditions.

SUMMARY OF THE INVENTION

One object of the present invention is to overcome the aforementioned disadvantages of conventional microwave susceptor materials. In particular, it is an object of the invention to avoid using adhesive to bond the plies of material together, thereby eliminating the expenses associated with testing adhesives for compliance with regulatory requirements and using a laminating machine to form the laminated construction.

Thus, it is a general object of the invention to provide a method of manufacturing a microwave susceptor material which is relatively inexpensive and less time consuming than conventional methods. Correspondingly, it is also an object to provide a microwave susceptor material which is cheaper than conventional microwave susceptor materials.

It is a further object of the invention to provide a method of manufacturing relatively complex microwave susceptor materials (for example, materials having as many as five plies) in a single bonding step. This capability to simultaneously bond together multiple plies of paper and film makes it feasible to produce microwave susceptor materials wherein a thermally fusible plastic film having a metallized surface is sandwiched between plies of paper with the outer surface of at least one of the plies of paper being covered with a clear film intended to serve as the food contact surface. Laminated material constructed in this manner avoids many of the shortcomings of conventional microwave susceptor materials associated with cracking of the metallized film during cooking, including the potential for contaminating the food product with fragments of the metallized film and the penetration of grease from the food into the underlying paper or paperboard substrate.

Yet another object of the invention is to provide a multiply microwave susceptor material having a substantially balanced structure, that is, the laminated material has the same composition on both sides of the metallized film. This in turn markedly reduces the tendency of the composite material to curl due to differential shrinkage in the different plies during the microwave cooking process.

A further object of the invention is to provide a microwave susceptor material which overcomes the problem of food products sticking to the surface of the container during cooking. In particular, some food products, such as bakery products of high sugar content, tend to stick to the surface of the polyester film of conventional microwave susceptor materials.

Another object of the invention is to provide a method of simultaneously bonding together several plies of material that comprise a microwave susceptor material and joining that stock to a paper or paperboard package such as a paper bag or a paperboard food carton. This combination of manufacturing steps eliminates the need for a separate manufacturing operation to produce the laminated susceptor stock and the need to transport and/or store laminated stock in preparation for manufacture of the complete package.

The foregoing objects are realized in accordance with the invention by providing a laminated microwave susceptor material having first and second plies of material ultrasonically bonded together over a part of an area thereof. The first ply of material is a layer of thermally fusible plastic such as a polyester, for example, poly(ethylene terephthalate); the second ply of material is a layer of paper or paperboard. At least one of the first and second plies of material includes a microwave interactive material capable of converting microwave energy to thermal energy. The microwave interactive material may consist of a metallized surface on the plastic layer or the paper, and in such cases the metal layer may be arranged between the plastic layer and the paper. The first and second plies of material are ultrasonically bonded along a multiplicity of bonding lines or rows of bonding spots. In this process, the heat fusible plastic is melted and resolidified to secure the first ply to the second ply. In some cases, bonding of the plies is obtained by a localized piercing or degrading of the metal coating that enables formation of a plastic-paper interface.

In accordance with a first preferred embodiment, a thermally fusible plastic layer having a metallized surface is ultrasonically bonded to a layer of paper. Alternatively, a thermally fusible plastic layer is ultrasonically bonded to a layer of paper having a metallized surface. In both embodiments the layer of metal is arranged between the plies of paper and plastic.

In accordance with another preferred embodiment of the invention, four plies are simultaneously joined together by ultrasonic bonding to form a composite microwave susceptor material. In order, the respective plies comprise a clear plastic film, a ply of paper, a lightly metallized plastic film and another ply of paper.

In accordance with yet another preferred embodiment of the invention, two plies are joined together by ultrasonic bonding to form a composite microwave susceptor material. The respective plies comprise a lightly metallized plastic film and a paperboard substrate coated with plastic.

In accordance with another preferred embodiment of the invention, five plies are simultaneously joined together by ultrasonic bonding to form a composite microwave susceptor material. In order, the respective plies comprise a clear plastic film, a ply of paper, a lightly metallized plastic film, another ply of paper and a clear plastic film.

In accordance with a last disclosed preferred embodiment of the invention, three plies are simultaneously joined together by ultrasonic bonding to form a composite microwave susceptor material. The respective plies comprise a lightly metallized plastic film sandwiched between two plies of silicone-coated paper. The silicone coating on one ply of paper is in contact with the food product, whereby a surface having excellent food release characteristics is interposed between the food product and the remainder of the construction.

Other objects, features and advantages of the present invention will be apparent when the detailed descriptions of the preferred embodiments of the invention are considered in conjunction with the drawings.

BRIEF DESCRIPTION OF THE DRAWINGS

The preferred embodiments of the microwave susceptor material in accordance with the invention will be hereinafter described in detail for illustrative purposes only with reference to the drawings, wherein.

DETAILED DESCRIPTION OF THE PREFERRED EMBODIMENTS

In accordance with the method of manufacturing of the invention, two or more plies of material are simultaneously joined together by ultrasonic bonding to form a composite microwave susceptor material. A first ply is made of a thermally fusible plastic and a second ply is a paper or paperboard substrate. Either the surface of the plastic which faces the paper or paperboard substrate or the surface of the paper or paperboard substrate which faces the plastic is lightly metallized. This metal coating performs the function of converting microwave radiation into thermal energy during microwave cooking of food products held in a container made of the composite microwave susceptor material. The use of lightly metallized materials as microwave susceptors is well known and the prior art describes suitable levels of metallization and methods of characterization.

During the ultrasonic bonding process small areas of the plastic material are first melted and then resolidified, and the plastic ply and the paper ply are thus joined with a multiplicity of spot bonds. In those cases where the metal coating lies between the ply of fusible plastic and the paper or paperboard substrate, localized piercing or degrading of the metal coating occurs, enabling the melted plastic to penetrate the metal coating and form plastic-paper bonds. Additional plies can be laminated during the same ultrasonic bonding step. In one of the examples discussed below, five plies are laminated together during one ultrasonic bonding operation.

Ultrasonic bonding is carried out using a Branson Model 8400 Ultrasonic Assembly System with a continuous sealing fixture for forming seals on flat pieces of material. With this machine the materials to be bonded are laid together and run between a stationary ultrasonic horn and a rotating anvil with pressure applied to compress the materials between the horn and the rotating anvil. The anvil provided a row of bonding spots in the form of small rectangles each about 1 mm by 2 mm and spaced about 2 mm apart.

Figure 1:
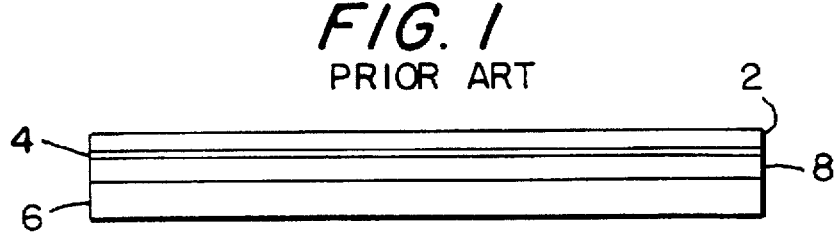
FIG. 1 is a diagram showing the laminated structure of a conventional microwave susceptor material.
Figure 2:
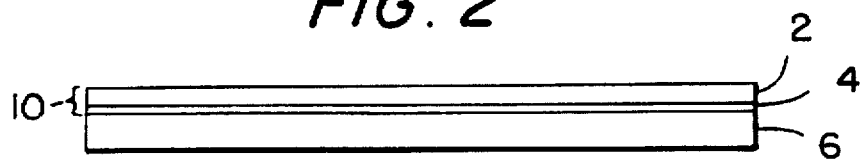
FIG. 2 is a diagram showing the laminated structure of a microwave susceptor material in accordance with a first preferred embodiment of the invention.
Figure 3:
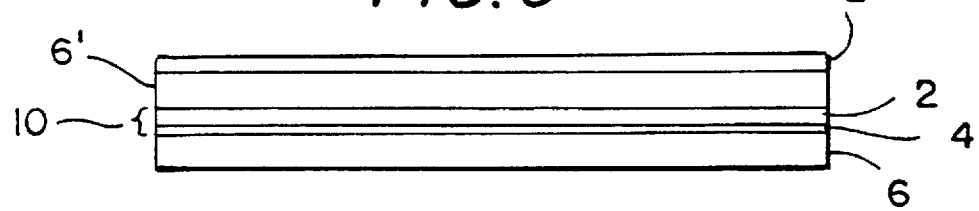
FIG. 3 is a diagram showing the laminated structure of a microwave susceptor material in accordance with a second preferred embodiment of the invention.
Figure 4:
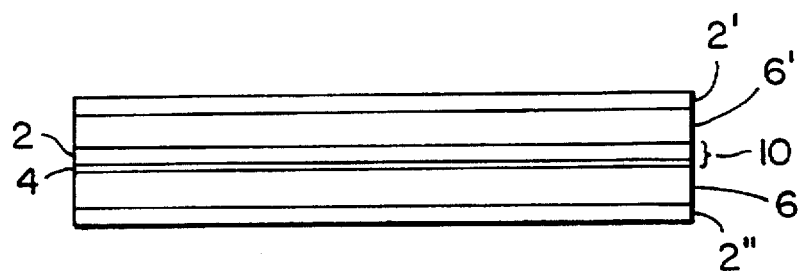
FIG. 4 is a diagram showing the laminated structure of a microwave susceptor material in accordance with a third preferred embodiment of the invention.

In accordance with a first preferred embodiment of the invention depicted in FIG. 2, the composite microwave susceptor material consists of a metallized thermally fusible plastic ply 10 ultrasonically bonded to a single ply of paper 6. The plastic ply 10 comprises a plastic film 2 having a metallized surface 4 adjacent the paper 6. Optionally, in accordance with a second preferred embodiment depicted in FIG. 3, a second ply of paper 6' is laminated to the unmetallized surface of the metallized plastic film and a clear plastic film 2' is laminated to the second ply of paper 6'. In a further variation dsepicted in FIG. 4, the surface of the first ply of paper 6 not facing the metallized surface 4 of the plastic film 2 has a clear plastic film 2" laminated thereto.

Figure 5:
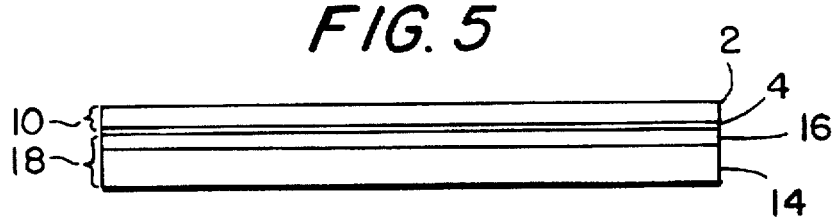
FIG. 5 is a diagram showing the laminated structure of a microwave susceptor material in accordance with a fourth preferred embodiment of the invention.

In accordance with a fourth preferred embodiment of the invention depicted in FIG. 5, the composite microwave susceptor material consists of a metallized thermally fusible plastic ply 10 ultrasonically bonded to a ply 18 of plastic-coated paperboard. In this embodiment the plastic film 2 has a metallized surface 4 adjacent the plastic coating 16 on the paperboard 14.

Figure 6:
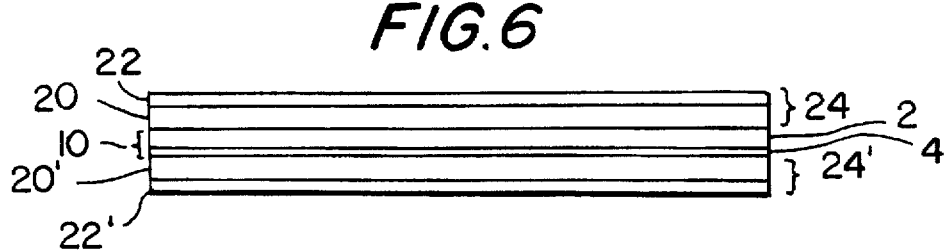
FIG. 6 is a diagram showing the laminated structure of a microwave susceptor material in accordance with a fifth preferred embodiment of the invention.

In accordance with a fifth preferred embodiment of the invention depicted in FIG. 6, the composite microwave susceptor material consists of a metallized thermally fusible plastic ply 10 ultrasonically bonded to and sandwiched between a pair of plies 24 and 24' of paper, each ply comprising a layer of paper 20, 20' having a surface coated with silicone coating 22, 22'. In this embodiment the plastic film 2 has a metallized surface 4 facing paper layer 20' and the silicone coatings 22, 22' face outwardly on both sides of the laminate.

Figure 7:
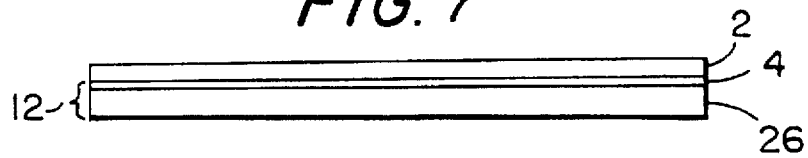
FIG. 7 is a diagram showing the laminated structure of a microwave susceptor material in accordance with a sixth preferred embodiment of the invention.

Finally, in accordance with a sixth preferred embodiment of the invention depicted in FIG. 7, the composite microwave susceptor material consists of a thermally fusible plastic film 2 ultrasonically bonded to a single ply 12 of glassine paper. The ply 12 comprises glassine paper 26 having a metallized surface 4 adjacent the plastic film 2.

A specific example of each of the foregoing preferred embodiments is described in detail below for illustrative purposes only. It would be obvious to a practitioner of ordinary skill in the art that the following compositions and dimensions can be varied without adversely affecting the functionality of the invention. After the examples are discussed in detail, some of the possible variations and modifications of the invention will be briefly described.

EXAMPLE 1

In accordance with a first example, a two-ply material was prepared from a lightly metallized polyester film and a single ply of paper. The lightly metallized polyester film was 0.5-mil polyester film metallized to provide an optical density of 0.18 to 0.24. The paper was an uncoated bleached white paper supplied by International Paper Co. and identified as 60-lb. Springhill Offset paper.

Figure 8:
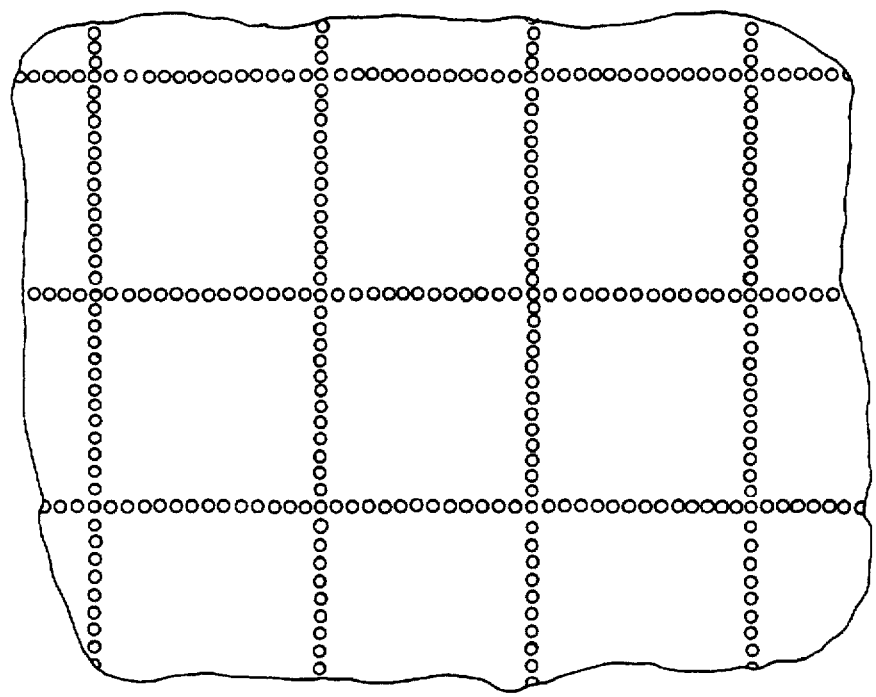
FIG. 8 is a top view showing an arrangement of bonding spots in accordance with a first pattern.

The film and paper were run through the Branson Model 8400 Ultrasonic Assembly System in multiple passes with the film against the ultrasonic horn and the paper against the anvil, with the metallized side of the film against the paper. Bond lines were generated in two perpendicular directions to produce a grid pattern of squares having a side dimension of 0.5" to 0.75". Such a grid pattern is depicted in FIG. 8. With this bonding pattern the unbonded area between the bond lines comprised about 75% of the total area of the material. In this ultrasonic bonding process, the running speed is determined by the speed of the rotating anvil. In this case the running speed was 20 to 60 feet per minute.

The resulting composite microwave susceptor material was tested by cooking a frozen CELESTE brand microwave pizza on the film side of the ultrasonically bonded sample in a standard 700-watt microwave oven for 5 min. Visual observations yield good browning and crisping over the entire bottom surface of the pizza. For comparison, a pizza of the same type was cooked in the same microwave oven without use of the ultrasonically bonded microwave susceptor material. This pizza had a soft, somewhat soggy crust and lacked both browning and crisping.

EXAMPLE 2

In accordance with a second example, a four-ply material was prepared from the following materials: (1) a clear polyester film (0.5 mil thickness); (2) a ply of 60-lb. offset paper; (3) a lightly metallized polyester film (1.0 mil thickness and 0.19–0.23 optical density); and (4) a ply of 60-lb. offset paper.

This combination of materials was stacked together in the order listed above and then bonded together using the same ultrasonic bonding machine used in Example 1. The same rotating anvil formed rows of bonding spots in the shape of small rectangles. In this case the materials were run through the ultrasonic bonding machine with the clear film in contact with the horn and the outer ply of paper in contact with the anvil. The metallized film was arranged so that the metallized side opposed the outer ply of paper. The bonding pattern was a grid of 2" squares and the unbonded area between rows of bonding spots comprised about 92% of the total area.

The resulting composite microwave susceptor material was tested by cooking a frozen CELESTE brand microwave pizza in the same manner as in Example 1, in this case with the pizza lying on the clear film surface of the ultrasonically bonded sample. As in Example 1, there was good browning and crisping over the entire bottom surface of the pizza.

EXAMPLE 3

In accordance with a third example, a five-ply material was prepared from the following materials: (1) a clear polyester film (0.5 mil thickness); (2) a ply of 60-lb. offset paper; (3) a lightly metallized polyester film (0.5 mil thickness and 0.18–0.24 optical density); (4) a ply of 60-lb. offset paper; and (5) a clear polyester film (0.5 mil thickness).

This combination of materials was stacked together in the order listed above and then bonded together into a five-ply laminate using the same ultrasonic bonding machine used in Examples 1 and 2. In this case the bonding pattern was a grid of 1.5" squares.

The five-ply construction of this example is a substantially balanced construction, having the same composition on both sides of the metallized polyester film. This substantially balanced construction is resistant to curling during microwave cooking, particularly when compared with the curling tendencies of conventional microwave susceptor materials.

The resulting five-ply microwave susceptor material was tested by cooking a frozen CELESTE brand microwave pizza in the same manner as in Example 1. The five-ply microwave susceptor material provided a moderate level of browning and crisping of the pizza crust.

EXAMPLE 4

In accordance with a fourth example, a two-ply microwave susceptor material was prepared from the following materials: (1) a lightly metallized polyester film (1.0 mil thickness and 0.19–0.23 optical density); and (2) bleached white paperboard (milk carton grade, 215 lb. per 3000 sq. ft) extrusion coated with a 1.25-mil layer of polyester resin.

Figure 9:
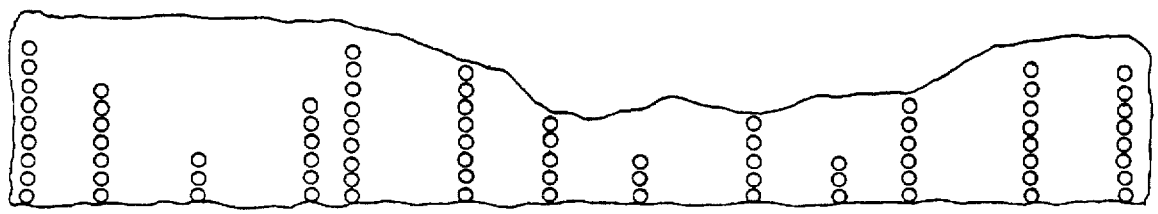
FIG. 9 is a top view showing an arrangement of bonding spots in accordance with a second pattern.

This combination of materials was ultrasonically bonded in the same manner as the materials of Examples 1 to 3. The metallized film was arranged so that the metallized side opposed the polyester-coated surface of the paperboard. The materials were run through the Branson ultrasonic bonding machine with the film in contact with the horn and the uncoated side of the paperboard in contact with the anvil. In this case the bonding pattern consisted of parallel rows of small rectangular bonding spots having the same dimensions and spacing as described for Example 1. The parallel rows were spaced 0.5" apart. Such a pattern of bonding spots is depicted in FIG. 9.

This ultrasonically bonded microwave susceptor material was tested to quantitatively determine its microwave heating characteristics. A small sample was placed on a small glass beaker in a standard 700-watt microwave oven with a separate beaker containing 100 ml of water in the back of the oven to simulate the presence of food. The temperature on the polyester film surface of the sample was monitored during the test with a Luxtron fiber optic thermometer, with the fiber optic probes contacting the film surface of the sample. The sample reached 391° F. in 30 sec and reached a maximum temperature of 398° F. at 36 sec. For comparison, a polyester-coated paperboard without metallized film bonded thereto will reach a temperature of only 150°–200° F. in the same test.

EXAMPLE 5

The following example illustrates the use of a coated paper stock to provide both the dimensional stability contributed by the paper and a functional grease-resistant food contact surface. The coated paper stock used in this example was a silicone-coated paper identified as SBL 42 SC Silox IU/O, supplied by Akrosil Company, with a silicone coating on one side only. A sandwich construction was produced with a single ply of lightly metallized polyester film (0.5 mil thickness and 0.26–0.27 optical density) arranged between two plies of silicone-coated paper, with the silicone-coated surface of the paper facing outwardly on both sides of the sample so that the uncoated side of the paper was next to the metallized film.

This three-ply construction was bonded on the same machine and in the same general manner as used in the preceding examples. In this case the bonding pattern was a grid of 1" squares.

The resulting three-ply microwave susceptor material was tested by cooking a frozen CELESTE brand microwave pizza in the same manner as in Examples 1 to 3. In this case the pizza was placed on one of the silicone-coated paper surfaces. The pizza had good browning and crisping over the entire bottom surface. Further, there was no sticking of any portion of the pizza to the surface of the silicone-coated paper, including spots where the melted cheese had run off the crust and had burned along the edge of the pizza. The silicone-coated paper provided an excellent food release surface as well as a functional grease barrier.

EXAMPLE 6

A sixth and last example demonstrates that the invention is not dependent on the use of a metallized plastic film as the microwave interactive component. In accordance with this example, a two-ply material was prepared from a polyester film and a ply of metallized glassine paper, the latter forming the microwave interactive component. The base paper was a bleached glassine paper with a basis weight of 25 lb. per 3000 sq. ft supplied by Nicolet Paper Company. This paper was vacuum metallized with aluminum, using well-known methods for the vacuum deposition of metals on paper substrates, to provide a stock with an electrical resistivity of about 200 ohms per square.

The metallized glassine paper was ultrasonically bonded to a single ply of 0.5 mil thick clear polyester film with the metallized side of the paper facing the film. The machine and method of ultrasonic bonding were the same as in the preceding examples. The bonding operation was performed with the clear film in contact with the ultrasonic horn. The bonding pattern was a grid of 1" squares.

The resulting composite microwave susceptor material was tested by cooking a frozen CELESTE brand microwave pizza on the polyester film side of the ultrasonically bonded sample under the same conditions used for testing of examples 1–3 and 5. In this case the pizza had good browning and crisping over about half of the area of the crust and fair browning and crisping over the remaining area.

Although the invention has been described with reference to certain preferred embodiments and examples, it will be appreciated that structural variations and modifications may be readily devised by practitioners of ordinary skill in the pertinent art. First, the metallized plastic film can be based on a plastic film other than polyester film. For example, a polycarbonate film could be used. Second, a metallized paper other than metallized glassine, such as metallized parchment paper, could be used in Example 6. Furthermore, neither the metallized plastic film nor the metallized paper need have metallization over the entire area of the material. Films or paper with patterns of metallization or demetallization may be preferred for some applications. In addition, where a clear plastic film is used on one or both faces of the composite microwave susceptor material of the invention as in Examples 2, 3 and 6, other films, such as poly (methylpentene) film, can be used in place of polyester film. Also in cases where a plain paper is used, such as the 60-lb. offset paper of Examples 1 to 3, other plain papers of different weights could be substituted for 60-lb. paper. Moreover, other coated paper stocks could be substituted for the silicone-coated paper of Example 5; and other paperboard stocks could be substituted for the polyester-coated paperboard of Example 4. Finally, the paper or paperboard need not be comprised entirely or even partially of cellulosic fibers. For example, a totally synthetic paper made of heat-stable fibers, such as Nomex polyaramid fiber paper supplied by the DuPont Co., could be used.

In addition, the method in accordance with the invention may be varied. It is permissible to use other ultrasonic bonding machines that operate differently than the Branson machine used in the above-described examples. For example, the method of the invention could be practiced with an ultrasonic bonding machine that produces the bonding pattern with a reciprocating device that contacts the material to be bonded while the material is held stationary. Also, there are many alternatives to the rows of rectangular bonding spots formed in all of the above-described examples. For example, instead of being rectangular, the bonding spots could be circular. Also, instead of being arranged in a grid of rows and columns of spots, the bonding spots could be randomly arrayed or arranged in a pattern of wavy or zig-zag lines.

All of the foregoing variations and modifications are within the scope and spirit of the invention as defined in the claims appended hereto.

I claim:

1. A laminated microwave susceptor material comprising first and second plies of material ultrasonically bonded together over bonding portions of an area thereof, wherein said first ply of material comprises a layer of thermally fusible plastic, said second ply of material comprises a layer of paper product, and at least one of said first and second plies of material comprises a metallized layer of microwave interactive material capable of converting microwave energy to thermal energy, said metallized layer being disposed between said plastic layer and said paper product layer, wherein a localized piercing of said microwave interactive material of said metallized layer is obtained by said ultrasonic bonding at said bonding portions such that a bond interface is formed between the plastic material of said first ply and the paper material of said second ply at said bonding portions, whereby said plastic material penetrates through the localized piercing of the metallized layer and forms paper-plastic bonds.

2. The laminated microwave susceptor material as defined in claim 1, wherein said microwave interactive material comprises a metallized surface on said layer of thermally fusible plastic.

3. The laminated microwave susceptor material as defined in claim 1, wherein said microwave interactive material comprises a metallized surface on said layer of paper product.

4. The laminated microwave susceptor material as defined in claim 1, wherein said first and second plies of material are ultrasonically bonded along a multiplicity of bonding lines, said heat fusible plastic being melted and resolidified along said bonding lines during said ultrasonic bonding to secure said first ply to said second ply.

5. The laminated microwave susceptor material as defined in claim 1, wherein said first and second plies of material are ultrasonically bonded at a multiplicity of bonding spots, said heat fusible plastic being melted and resolidified at said bonding spots during said ultrasonic bonding to secure said first ply to said second ply.

6. The laminated microwave susceptor material as defined in claim 4, wherein said multiplicity of bonding lines comprise a first plurality of bonding lines arranged substantially parallel to each other.

7. The laminated microwave susceptor material as defined in claim 5, wherein said multiplicity of bonding spots comprise a first plurality of bonding spots arranged in rows running substantially parallel to each other.

8. The laminated microwave susceptor material as defined in claim 2, wherein said paper product of said second ply comprises paper and said metallized surface of said first ply faces said second ply of paper, further comprising a third ply ultrasonically bonded to said first ply and a fourth ply ultrasonically bonded to said third ply, said third ply comprising a layer of paper and said fourth ply comprising a layer of heat fusible plastic.

9. The laminated microwave susceptor material as defined in claim 8, wherein said first through fourth plies of material are bonded together at the same time at a multiplicity of bonding spots.

10. The laminated microwave susceptor material as defined in claim 8, wherein said first through fourth plies of material are bonded together at the same time along a multiplicity of bonding lines.

11. The laminated microwave susceptor material as defined in claim 2, wherein said paper product comprises paperboard.

12. The laminated microwave susceptor material as defined in claim 11, wherein said paperboard is extrusion coated with polyester resin, said polyester resin coating being in contact with said metallized surface of said first ply.

13. The laminated microwave susceptor material as defined in claim 2, wherein said paper product comprises paper and said metallized surface of said first ply faces said second ply of paper.

14. The laminated microwave susceptor material as defined in claim 13, further comprising a third ply of material ultrasonically bonded to said second ply of paper, a fourth ply of material ultrasonically bonded to said first ply of plastic, and a fifth ply of material ultrasonically bonded to said fourth ply, wherein said third ply comprises a layer of thermally fusible plastic, said fourth ply comprises paper and said fifth ply comprises a layer of thermally fusible plastic, and said first ply is sandwiched between said second and fourth plies of paper.

15. The laminated microwave susceptor material as defined in claim 14, wherein said first through fifth plies of material are bonded together at the same time at a multiplicity of bonding spots.

16. The laminated microwave susceptor material as defined in claim 14, wherein said first through fifth plies of material are bonded together at the same time along a multiplicity of bonding lines.

17. The laminated microwave susceptor material as defined in claim 3, wherein said paper product comprises glassine paper.

18. The laminated microwave susceptor material as defined in claim 2, wherein said second ply comprises paper having a coating of silicone on one surface thereof and said metallized surface of said first ply faces an uncoated surface of said paper.

19. The laminated microwave susceptor material as defined in claim 18, further comprising a third ply of material ultrasonically bonded to said first ply, wherein said third ply comprises paper having a coating of silicone on one surface thereof and an uncoated surface of said paper of said third ply faces an unmetallized surface of said first ply.

20. The laminated microwave susceptor material as defined in claim 19, wherein said first through third plies of material are bonded together at the same time at a multiplicity of bonding spots.

21. The laminated microwave susceptor material as defined in claim 19, wherein said first through third plies of material are bonded together at the same time along a multiplicity of bonding lines.

22. The laminated microwave susceptor material as defined in claim 1, wherein said plastic comprises a thermoplastic polyester.

23. A method for manufacturing a laminated microwave susceptor material comprising the following steps:

laying first and second plies of material together, said first ply of material comprising a layer of thermally fusible plastic and said second ply of material comprising a layer of paper product and at least one of said first and second plies of material comprises a metallized layer of microwave interactive material capable of converting microwave energy to thermal energy, said metallized layer being disposed between said plastic layer and said paper product layer, and ultrasonically bonding said first and second plies together over bonding portions of an area thereof so as to obtain a localized piercing of said metallized layer of microwave interactive material by said ultrasonic bonding at said bonding portions such that a bond interface is formed between said thermally fusible plastic material of said first ply and said paper material of said second ply at said bonding portions, whereby said plastic material penetrates through the localized piercing of the metallized layer and forms paper-plastic bonds.

24. The method for manufacturing a laminated microwave susceptor material as defined in claim 23, wherein said microwave interactive material comprises a metallized surface on said layer of thermally fusible plastic which faces said layer of paper product.

25. The method for manufacturing a laminated microwave susceptor material as defined in claim 23, wherein said microwave interactive material comprises a metallized surface on said layer of paper product which faces said layer of thermally fusible plastic.

26. The method for manufacturing a laminated microwave susceptor material as defined in claim 23, wherein said first and second plies of material are ultrasonically bonded along a multiplicity of bonding lines, said heat fusible plastic being melted and resolidified along said bonding lines during said ultrasonic bonding to secure said first ply to said second ply.

27. The method for manufacturing a laminated microwave susceptor material as defined in claim 23, wherein said first and second plies of material are ultrasonically bonded at a multiplicity of bonding spots, said heat fusible plastic being melted and resolidified at said bonding spots during said ultrasonic bonding to secure said first ply to said second ply.

28. The method for manufacturing a laminated microwave susceptor material as defined in claim 26, wherein said multiplicity of bonding lines comprise a first plurality of bonding lines arranged substantially parallel to a first direction.

29. The method for manufacturing a laminated microwave susceptor material as defined in claim 28, wherein said multiplicity of bonding lines further comprises a second plurality of bonding lines arranged substantially parallel to a second direction, said first and second directions being substantially mutually perpendicular.

30. The method for manufacturing a laminated microwave susceptor material as defined in claim 27, wherein said multiplicity of bonding spots comprise a first plurality of bonding spots arranged in rows running substantially parallel to a first direction.

31. The method for manufacturing a laminated microwave susceptor material as defined in claim 30, wherein said multiplicity of bonding spots further comprises a second plurality of bonding spots arranged in columns substantially parallel to a second direction, said first and second directions being substantially mutually perpendicular.

32. The method for manufacturing a laminated microwave susceptor material as defined in claim 31, wherein each bonding spot has an area substantially equal to 2 square millimeters and successive bonding spots in a row are spaced substantially 2 mm apart.

33. The method for manufacturing a laminated microwave susceptor material as defined in claim 23, wherein said plastic comprises thermoplastic polyester.

34. The method for manufacturing a laminated microwave susceptor material as defined in claim 23, wherein said paper product comprises paper.

35. The method for manufacturing a laminated microwave susceptor material as defined in claim 23, wherein said paper product comprises paperboard.

36. The method for manufacturing a laminated microwave susceptor material as defined in claim 23, wherein after said first and second plies are laid together and before said first and second plies are ultrasonically bonded together, a third ply of material is laid on said first ply.

* * * * *

UNITED STATES PATENT AND TRADEMARK OFFICE
CERTIFICATE OF CORRECTION

PATENT NO.     : 5,723,223
DATED          : March 3, 1998
INVENTOR(S)    : James R. Quick It is certified that error appears in the above-identified patent and that said Letters Patent is hereby corrected as shown below:

Column 4, line 31, change "provided" to -- provides --.

Column 4, line 44, change "dsepicted" to -- depicted --.

Column 5, line 20, change "Co." to --Company --.

Column 6, line 59, "391°F" to -- 19°F --.

Signed and Sealed this

Twenty-second Day of February, 2000

Attest:

Q. TODD DICKINSON

*Attesting Officer*       *Commissioner of Patents and Trademarks*